(12) United States Patent
Fan et al.

(10) Patent No.: US 9,542,027 B2
(45) Date of Patent: Jan. 10, 2017

(54) PRESSURE-BASED INPUT METHOD FOR USER DEVICES

(71) Applicant: AT&T Intellectual Property I, L.P., Atlanta, GA (US)

(72) Inventors: James W Fan, San Ramon, CA (US); Venson Shaw, Kirkland, WA (US); Jeffrey A Aaron, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 306 days.

(21) Appl. No.: 14/254,059

(22) Filed: Apr. 16, 2014

(65) Prior Publication Data

US 2015/0301671 A1    Oct. 22, 2015

(51) Int. Cl.
| | |
|---|---|
| *G06F 3/00* | (2006.01) |
| *G06F 3/041* | (2006.01) |
| *G06F 3/0482* | (2013.01) |
| *G06F 3/0484* | (2013.01) |
| *G06F 3/0488* | (2013.01) |
| *G06F 3/01* | (2006.01) |
| *G06F 3/048* | (2013.01) |

(52) U.S. Cl.
CPC ............ *G06F 3/0414* (2013.01); *G06F 3/014* (2013.01); *G06F 3/048* (2013.01); *G06F 3/0416* (2013.01); *G06F 3/0482* (2013.01); *G06F 3/0488* (2013.01); *G06F 3/04842* (2013.01); *G06F 3/04847* (2013.01)

(58) Field of Classification Search
CPC ...................................................... G06F 3/0414
USPC ......................................................... 715/762
See application file for complete search history.

(56) References Cited

U.S. PATENT DOCUMENTS

| | | | | |
|---|---|---|---|---|
| 6,570,078 B2* | 5/2003 | Ludwig | ..................... | G10H 1/00 84/464 R |
| 6,610,917 B2* | 8/2003 | Ludwig | ..................... | G10H 1/00 84/726 |
| 6,849,795 B2* | 2/2005 | Ludwig | ..................... | G10H 1/00 84/609 |
| 6,852,919 B2* | 2/2005 | Ludwig | ..................... | G10H 1/00 84/600 |
| 7,012,593 B2 | 3/2006 | Yoon et al. | | |
| 7,038,123 B2* | 5/2006 | Ludwig | ..................... | G10H 1/00 84/600 |
| 7,217,878 B2* | 5/2007 | Ludwig | ..................... | G10H 1/00 84/609 |

(Continued)

FOREIGN PATENT DOCUMENTS

| | | |
|---|---|---|
| GB | 2434689 | 8/2007 |
| WO | WO 2012/167098 | 12/2012 |

OTHER PUBLICATIONS

International Search Report and Written Opinion dated Jul. 1, 2015 in International Application No. PCT/US2015/025688.

*Primary Examiner* — William Titcomb
(74) *Attorney, Agent, or Firm* — Hartman & Citrin LLC

(57) ABSTRACT

Concepts and technologies disclosed herein are directed to a pressure-based input method for user devices. According to one aspect disclosed herein, a user device can receive an output from a pressure sensor. The output can include parameters associated with a pressure applied to the pressure sensor by a user. The user device can analyze the output to determine a command to be executed by the user device. The user device can execute the command.

20 Claims, 9 Drawing Sheets

(56) References Cited

U.S. PATENT DOCUMENTS

| | | | |
|---|---|---|---|
| 7,309,828 B2 * | 12/2007 | Ludwig | G10H 1/00 84/622 |
| 7,408,108 B2 * | 8/2008 | Ludwig | G10H 1/00 84/718 |
| 7,507,902 B2 * | 3/2009 | Ludwig | G10H 1/00 84/723 |
| 7,569,762 B2 * | 8/2009 | Baum, Jr. | G10H 1/0083 84/615 |
| 7,598,449 B2 * | 10/2009 | Sullivan | G10H 1/342 84/615 |
| 7,638,704 B2 * | 12/2009 | Ludwig | G10H 1/00 84/645 |
| 7,652,208 B1 * | 1/2010 | Ludwig | G10H 1/00 84/622 |
| 7,759,571 B2 * | 7/2010 | Ludwig | G10H 1/00 84/723 |
| 7,767,902 B2 * | 8/2010 | Ludwig | G10H 1/00 84/645 |
| 7,786,370 B2 * | 8/2010 | Ludwig | G10H 1/00 84/622 |
| 7,897,866 B2 * | 3/2011 | Sullivan | G10H 1/342 84/440 |
| 7,960,640 B2 * | 6/2011 | Ludwig | G10H 1/00 84/622 |
| 8,003,877 B2 * | 8/2011 | Elion | G10H 1/0066 84/646 |
| 8,030,565 B2 * | 10/2011 | Ludwig | G10H 1/00 84/622 |
| 8,030,566 B2 * | 10/2011 | Ludwig | G10H 1/00 84/622 |
| 8,030,567 B2 * | 10/2011 | Ludwig | G10H 1/00 84/615 |
| 8,035,024 B2 * | 10/2011 | Ludwig | G10H 1/00 84/622 |
| 8,035,629 B2 | 10/2011 | Daniel | |
| 8,049,730 B2 * | 11/2011 | Joguet | G06F 3/041 178/18.01 |
| 8,148,624 B2 * | 4/2012 | Raisanen | G10H 1/055 84/615 |
| 8,173,887 B2 * | 5/2012 | Sullivan | G10H 1/342 84/724 |
| 8,362,350 B2 | 1/2013 | Kockovic | |
| 8,477,111 B2 * | 7/2013 | Lim | G06F 3/03547 178/18.01 |
| 8,519,250 B2 * | 8/2013 | Ludwig | G10H 1/00 84/477 R |
| 8,569,608 B2 * | 10/2013 | Moon | G10H 1/0553 84/264 |
| 8,581,086 B2 * | 11/2013 | McMillen | G10H 1/125 84/645 |
| 8,604,364 B2 * | 12/2013 | Simon | G06F 3/03547 178/18.03 |
| 8,702,513 B2 * | 4/2014 | Lim | A63F 13/10 463/31 |
| 8,716,585 B2 * | 5/2014 | Ludwig | G10H 1/32 84/644 |
| 8,717,303 B2 * | 5/2014 | Ludwig | G10H 1/00 178/18.01 |
| 8,743,068 B2 * | 6/2014 | Ludwig | G10H 1/00 178/18.01 |
| 8,743,076 B1 * | 6/2014 | Ludwig | G10H 1/00 178/18.01 |
| 8,797,288 B2 * | 8/2014 | Zaliva | G06F 3/04883 345/173 |
| 8,816,956 B2 * | 8/2014 | Ludwig | G06F 3/0346 345/156 |
| 8,859,876 B2 * | 10/2014 | Ludwig | G10H 1/00 84/609 |
| 8,866,785 B2 * | 10/2014 | Ludwig | G10H 1/00 178/18.01 |
| 8,878,807 B2 * | 11/2014 | Ludwig | G10H 1/00 345/173 |
| 8,878,810 B2 * | 11/2014 | Ludwig | G10H 1/00 178/18.01 |
| 8,949,477 B2 * | 2/2015 | Drasnin | G06F 9/4415 710/8 |
| 8,952,892 B2 * | 2/2015 | Chai | G06F 3/0418 345/156 |
| 8,981,198 B2 * | 3/2015 | Nakatani | G10H 3/185 84/626 |
| 9,024,884 B2 * | 5/2015 | Lengeling | G06F 3/04847 345/173 |
| 9,052,772 B2 * | 6/2015 | West | G06F 3/0416 |
| 9,104,260 B2 * | 8/2015 | Marsden | G06F 3/0416 |
| 9,110,590 B2 * | 8/2015 | Marsden | G06F 3/04886 |
| 9,196,235 B2 * | 11/2015 | Ball | G10H 1/18 |
| 9,281,793 B2 * | 3/2016 | Cheever | H03G 5/00 |
| 9,304,677 B2 * | 4/2016 | Ludwig | G10H 1/00 |
| 9,324,310 B2 * | 4/2016 | McPherson | G10H 7/06 |
| 2002/0005108 A1 * | 1/2002 | Ludwig | G10H 1/00 84/600 |
| 2003/0214481 A1 | 11/2003 | Xiong | |
| 2005/0156895 A1 | 7/2005 | Ho | |
| 2007/0063849 A1 | 3/2007 | Rosella et al. | |
| 2008/0136775 A1 | 6/2008 | Conant | |
| 2009/0236153 A1 * | 9/2009 | Kyung | G06F 1/20 178/19.01 |
| 2010/0231505 A1 | 9/2010 | Iwata | |
| 2010/0271302 A1 | 10/2010 | Pering et al. | |
| 2012/0293410 A1 | 11/2012 | Bell | |
| 2012/0306632 A1 * | 12/2012 | Fleizach | G06F 3/016 340/407.2 |
| 2013/0063364 A1 | 3/2013 | Moore | |
| 2013/0265229 A1 | 10/2013 | Forountanpour et al. | |
| 2014/0118308 A1 * | 5/2014 | Rhee | G06F 3/0383 345/177 |
| 2016/0077581 A1 * | 3/2016 | Shi | G06F 3/011 340/12.5 |

* cited by examiner

PRESSURE-BASED INPUT METHOD FOR USER DEVICES

BACKGROUND

Humans interact with devices in various ways. Keyboards, mice and trackpads, for example, have been used for years to enable users to interact with computers and are still relevant input mechanisms for providing accurate input control with excellent tactile feedback. One downside of these input mechanisms, however, is limited customizability. Apart from adding additional keys and allowing for custom key bindings, keyboards are still restrained by the requirement to function correctly across a wide range of applications. Touchscreens, on the other hand, allow near limitless customizability since touchscreens can be customized through software to display any soft button or other graphical user interface ("GUI") element, and do not rely on hardware keys and buttons to be mapped to particular functions of a given application.

In recent years, human-machine interface designers have looked to voice and gestures to enable hands-free interaction with devices such as smartphones, computers, televisions, and gaming systems. Voice is a promising input method, but complications still exist to successfully enable voice recognition technology to understand natural language, and instead, users are often required to interact with a voice recognition system using a specific syntax with which the users must become familiar. Gesture-based input is another promising input method, but acceptance of gesture-based input has proven difficult for sustainable adoption by mainstream users.

SUMMARY

Concepts and technologies disclosed herein are directed to a pressure-based input method for user devices. According to one aspect disclosed herein, a user device can receive an output from a pressure sensor. The output can include parameters associated with a pressure applied to the pressure sensor by a user. The user device can analyze the output to determine a command to be executed by the user device. The user device can execute the command.

In some embodiments, the user device executes a pressure analysis module to analyze the output to determine whether the parameters associated with the pressure applied to the pressure sensor by the user matches a pressure profile associated with the command. If the user device determines that the parameters associated with the pressure applied to the pressure sensor by the user matches a pressure profile associated with the command, the pressure analysis module can instruct the user device to execute the command. If the user device determines that the parameters associated with the pressure applied to the pressure sensor by the user does not match a pressure profile associated with the command, the pressure analysis module can instruct the user device to take no action In some embodiments, the pressure profile includes a default pressure profile. The default pressure profile can be provided by an operating system of the user device.

In some other embodiments, the pressure profile includes a custom pressure profile. In these embodiments, the user device can launch a custom pressure profile creation application. The custom pressure profile creation application can prompt the user to select a first option to create a new custom pressure profile or a second option to modify an existing custom pressure profile. The user device can receive, via the custom pressure profile creation application, a selection of the first option or the second option.

If the selection is for the first option, the custom pressure profile creation application can present a pressure sensor selection interface through which the user can select at least one sensor from a plurality of available sensors from which to utilize pressure output. The user device can receive, via the custom pressure profile creation application, a selection of at least one sensor from a plurality of available sensors from which to utilize pressure output. The user device can present, via the custom pressure profile creation application, a pressure sensor definition interface through which the user can provide a pressure definition for each sensor in the selection of the at least one sensor from the plurality of available sensors. The user device can receive, via the custom pressure profile creation application, the pressure definition for each sensor in the selection of the at least one sensor from the plurality of available sensors. The user device can create, via the custom pressure profile creation application, the custom pressure profile. The custom pressure profile can include the pressure definition for each sensor in the selection of the at least one sensor from the plurality of available sensors.

If the selection is for the second option, the user device can load, via the custom pressure profile creation application, the existing custom pressure profile. The user device can receive, via the custom pressure profile creation application, a modification to the existing custom pressure profile.

In some embodiments, the user device can present a command settings interface. The user device can receive, via the command settings interface, an input to assign a pressure profile to the command. The user device can assign the pressure profile to the command. In some embodiments, the command settings interface is part of an operating system executing on the user device. In these embodiments, the command can be associated with an operation of the operating system. In some other embodiments, the command settings interface is part of an application executing on the user device. In these embodiments, the command can be associated with an operation of the application.

In some embodiments, the user device can receive a further output from a further pressure sensor. The further output can include further parameters of further pressure applied by the further pressure sensor by the user. The user device can analyze the further output in addition to the output to determine the command to be executed by the user device. In some embodiments, the parameters and the further parameters represent, at least in part, a sequence of application of the pressure and the further pressure. In some other embodiments, the parameters and the further parameters represent, at least in part, a pattern of application of the pressure and the further pressure.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

Other systems, methods, and/or computer program products according to embodiments will be or become apparent to one with skill in the art upon review of the following drawings and detailed description. It is intended that all such additional systems, methods, and/or computer program products be included within this description, be within the scope of this disclosure.

DETAILED DESCRIPTION

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Figure 1:
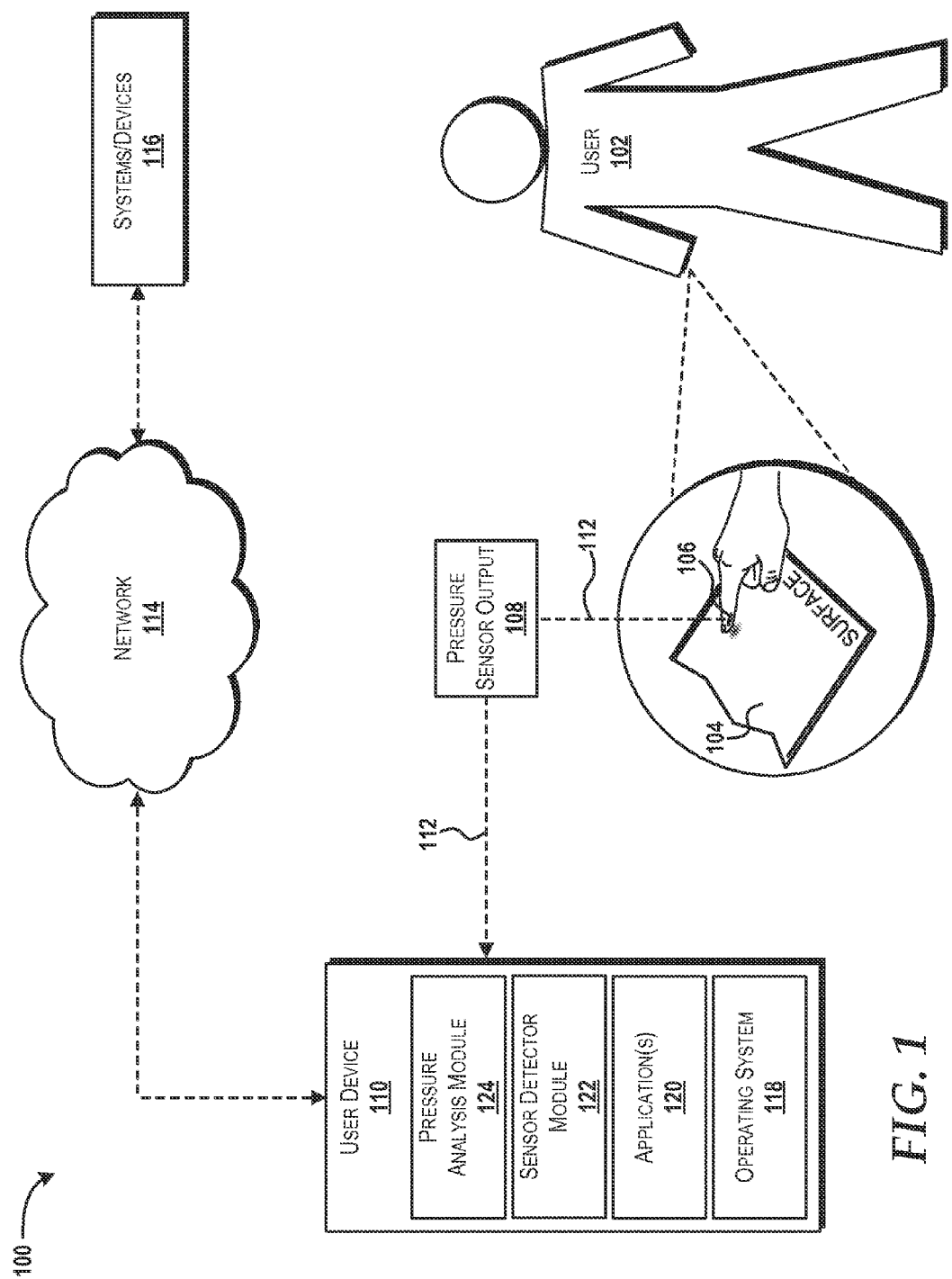
FIG. 1 is a system diagram illustrating an illustrative operating environment for the various embodiments disclosed herein.

Referring now to FIG. 1, aspects of an operating environment 100 for various embodiments of the concepts and technologies disclosed herein will be described. The operating environment 100 shown in FIG. 1 includes a user 102 who is in physical contact with a surface 104. In particular, the user 102 is touching the surface 104 with an index finger to which a pressure sensor 106 is attached. The pressure sensor 106 can measure pressure applied to the surface 104 by the index finger of the user 102 and can provide pressure sensor output 108 indicative of the pressure to a user device 110 via a communications path 112 established between the pressure sensor 106 and the user device 110. The user device 110 can analyze the pressure sensor output 108 to determine a command to be executed by the user device 110 and can execute the command.

The surface 104 can be any surface to which the user 102 can apply pressure. The surface 104 may be, for example, at least a portion of a floor, a ceiling, a wall, a piece of furniture, a piece of art or other decoration, the user device 110, another device, a body of the user 102, a body of another user, an animal, clothing, footwear, hand wear, headwear, jewelry, accessory, a vehicle, an object, or a food. The surface 104 can include a single surface or multiple surfaces.

In the illustrated example, the user 102 is in contact with the surface 104 using his or her index finger. It should be understood, however, that the user 102 may contact the surface 104 with another finger, multiple fingers, one or more toes, or any other body part(s), alone or in any combination. Although only one pressure sensor 106 is shown in the illustrated example as being attached to the user 102, multiple pressure sensors 106 may be attached to the same or different body parts of the user 102. The pressure sensor(s) 106 may additionally or alternatively be attached elsewhere, such as, for example, to one or more pieces of clothing, footwear, handwear, headwear, jewelry, or accessory worn by the user 102 and/or to the surface 104.

The user 102 can apply pressure to the surface 104 using various techniques or a combination of techniques to trigger the pressure sensor 106 to activate and measure pressure data. The user 102 may use single or multiple tap movements to trigger the pressure sensor 106, to activate and measure pressure data, and to send the pressure sensor output 108 indicative of the collected pressure data to the user device 110. The user device 110 can analyze the pressure sensor output 108 to determine a command to be executed by the user device 110 and can execute the command that is associated with the single or multiple tap movements. In this manner, it is contemplated that different numbers of tap movements can be associated with different commands. For example, a single tap may be used to unlock the user device 110 in lieu of the user 102 entering a password or providing a fingerprint or other biometric. As another example, a multiple tap may be used to cause the user device 110 to launch a camera application. A subsequent tap (e.g., within a pre-defined time) may then be used to capture an image. It should be understood that these examples are not exhaustive and therefore should not be construed as being limiting in any way. In particular, although a tap movement is used herein to describe some use cases for the concepts and technologies described herein, other applications of pressure to the surface 104 can be measured by the pressure sensor 106 and provided to the user device 110 as the pressure sensor output 108 for analysis.

The user 102 may vary the contact time of a tap movement to trigger the pressure sensor 106 to activate and measure pressure data, and to send the pressure sensor output 108 indicative of the collected pressure data to the user device 110. The user device 110 can analyze the pressure sensor output 108 to determine a command to be executed by the user device 110 and can execute the command that is associated with the contact time. For example, a tap less than 0.5 seconds may trigger the user device 110 to execute a first command, a tap greater than 0.5 seconds and less than 1 second may trigger the user device 110 to execute a second command, and a tap greater than 1 second may trigger the user device 110 to execute a third command. It should be understood that these examples are not exhaustive and therefore should not be construed as being limiting in any way.

The user 102 may vary the frequency of tap movements to trigger the pressure sensor 106 to activate and collect pressure data, and to send the pressure sensor output 108 indicative of the collected pressure data to the user device 110. The user device 110 can analyze the pressure sensor output 108 to determine a command to be executed by the user device 110 and can execute the command that is associated with the contact time. For example, 1 tap per second may trigger the user device 110 to execute a first command, 2 taps per second may trigger the user device 110 to execute a second command, and 3 taps per second may trigger the user device 110 to execute a third command. It should be understood that these examples are not exhaustive and therefore should not be construed as being limiting in any way.

The user 102 may apply pressure to the pressure sensor 106 in a pattern that utilizes a number of tap movements, a contact time for each of the tap movements, and/or a frequency of the tap movements. In some embodiments, the pressure sensor 106 is combined with one or more additional pressure sensors to allow for more complex patterns. For example, pressure sensors may be attached to a foot of the user, and more particularly, to the ball of the foot, the heel of the foot, and both sides of the foot, so that the user 102 can move his or her foot in a pattern to cause the user device 110 to execute one or more commands. It should be understood that these examples are not exhaustive and therefore should not be construed as being limiting in any way.

The user 102 may apply pressure to the pressure sensor 106 and one or more additional pressure sensors in a sequence. For example, the pressure sensor 106 may be attached to an index finger of the user 102 as in the illustrated example, and may be combined with additional pressure sensors on each of the other fingers on the same hand of the user 102. The user 102 may then tap his or her fingers in a predetermined sequence to cause the user device 110 to execute one or more commands. It should be understood that these examples are not exhaustive and therefore should not be construed as being limiting in any way.

The pressure sensor 106, in some embodiments, is an off-the-shelf pressure sensor selected for a given implementation based upon factors, such as, for example, technology, design, performance, and cost. The pressure sensor 106, in some other embodiments, is designed specifically for use in accordance with the concepts and technologies disclosed herein. The pressure sensor 106 can utilize any pressure-sensing technology, some examples of which include piezoresistive strain gauge, capacitive, electromagnetic, piezoelectric, optical, potentiometric, resonant, thermal, or ionization as those skilled in the art will appreciate. The specifications of the pressure sensor 106, including, for example, minimum pressure, maximum pressure, measurement increments, battery life, communications capabilities (e.g., wired, BLUETOOTH, BLUETOOTH low energy, WI-FI, ZIGBEE, near-field communications, or infrared), and the like, can be selected for a given implementation.

The pressure sensor output 108 can be provided by the pressure sensor 106 to the user device 110 via the communications path 112. The communications path 112 can be established between the pressure sensor 106 and the user device 110 using any wired or wireless protocol. The communication path 112 established between the pressure sensor 106 and the user device 110 will be described herein as a wireless communication path that utilizes BLUETOOTH, BLUETOOTH low energy ("BLE"), WI-FI, ZIGBEE, near-field communications ("NFC"), infrared, a proprietary wireless protocol, or a combination thereof.

The user device 110, in the illustrated example, is operating in communication with and/or as part of a communications network ("network") 114. The network 114 can include one or more wireless local area networks ("WLANs"), one or more wireless wide area networks ("WWANS"), one or more wireless metropolitan area networks ("WMANs"), one or more wireless campus area networks ("WCANs"), and/or one or more packet data networks (e.g., the Internet). The user device 110 can communicate with the network 114 using any wireless communications technology or combination of wireless communications technologies, some examples of which include, but are not limited to, WI-FI, Global System for Mobile communications ("GSM"), Code Division Multiple Access ("CDMA") ONE, CDMA2000, Universal Mobile Telecommunications System ("UMTS"), Long-Term Evolution ("LTE"), Worldwide Interoperability for Microwave Access ("WiMAX"), other Institute of Electrical and Electronics Engineers ("IEEE") 802.XX technologies, and the like. The user device 110 can communicate with the network 114 via various channel access methods (which may or may not be used by the aforementioned technologies), including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Single-Carrier FDMA ("SC-FDMA"), Space Division Multiple Access ("SDMA"), and the like. Data can be exchanged between the user device 110 and the network 114 via cellular data technologies such as, but not limited to, General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and/or various other current and future wireless data access technologies. It should be understood that the network 114 may additionally include infrastructure that operates on wired communications technologies, including, but not limited to, optical fiber, coaxial cable, twisted pair cable, and the like to transfer data between various systems operating on or in communication with the network 114. Additional details regarding an illustrative example of the network 114 is illustrated and described with reference to FIG. 9.

The user device 110 can communicate with one or more systems and/or devices 116 via the network 114. The system(s)/device(s) 116 can include, but are not limited to, application servers, Web servers, data storage systems, network appliances, dedicated hardware device, computing devices, mobile computing devices (e.g., smartphones and tablets), and the like that alone or in combination host or provide access to various services, virtual machines, portals, other resources, Web portals, link pages, Web sites, and/or other information, all or a portion of which can be accessed by the user device 110.

The illustrated user device 110 includes an operating system 118, one or more applications 120, a sensor detector module 122, and a pressure analysis module 124. The operating system 118 is a computer program for controlling the operations of the user device 110. The application(s) 120 is/are executable program(s) configured to execute on top of the operating system 118 to provide various functions. The application(s) 120 may be any type of application(s), some examples of which include, but are not limited to, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like.

The sensor detector module 122 is configured to detect the pressure sensor 106, and potentially one or more additional pressure sensors, and to establish the communication path 112 with the pressure sensor 106. Establishment of the communication path 112 may be initiated by the sensor detector module 122 or the pressure sensor 106. The sensor detector module 122 can be implemented in hardware, software, firmware, or a combination thereof. The sensor detector module 122, in some embodiments, is a communications component configured to establish the communication path 112 with the pressure sensor 106 and to receive the pressure sensor output 108 from the pressure sensor 106. The sensor detector module 122, in some other embodiments, is a software module configured to instruct a communications component (not shown) of the user device 110 to establish the communication path 112 with the pressure sensor 106 and to receive the pressure sensor output 108 from the pressure sensor 106. In these embodiments, the sensor detector module 122 can be part of the operating system 118 and/or the application(s) 120.

The pressure analysis module 124 is configured to analyze the pressure sensor output 108 to determine a command to be executed by the user device 110, as will be described in greater detail below with reference to FIGS. 2 and 4. The pressure analysis module 124 can be implemented in hardware, software, firmware, or a combination thereof. The pressure analysis module 124, in some embodiments, is part of the operating system 118 and/or the application(s) 120.

FIG. 1 illustrates one user 102, one surface 104, one pressure sensor 106, one pressure sensor output 108, one user device 110, one communications path 112, one network 114, one operating system 116, one sensor detector module 122, and one pressure analysis module 124. It should be understood, however, that various implementations of the operating environment 100 include multiple users 102, multiple surfaces 104, multiple pressure sensors 106, multiple pressure sensor outputs 108, multiple user devices 110, multiple communications paths 112, multiple networks 114, multiple operating systems 116, multiple sensor detector modules 122, and multiple pressure analysis modules 124. As such, the illustrated embodiment should be understood as being illustrative, and should not be construed as being limiting in any way.

Figure 2:
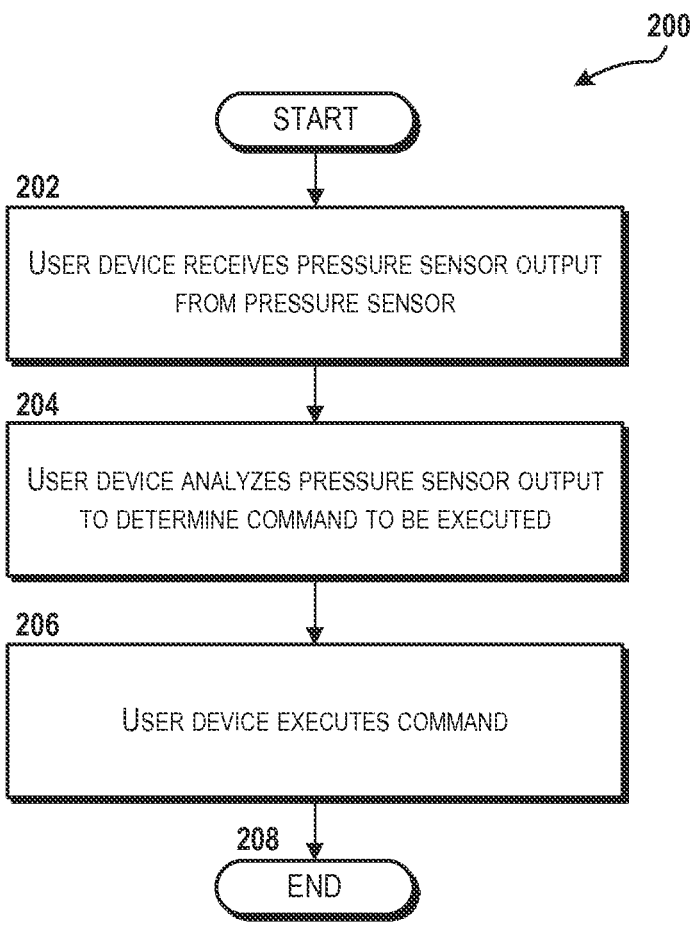
FIG. 2 is a flow diagram illustrating aspects of a method for executing device commands based upon pressure-based input, according to an illustrative embodiment.

Turning now to FIG. 2, a method 200 for executing device commands based upon pressure-based input will be described, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as, for example, the user device 110 to perform one or more operations and/or causing the processor to direct other components of the computing system or device to perform one or more of the operations.

For purposes of illustrating and describing the concepts of the present disclosure, operations of the methods disclosed herein are described as being performed by the user device 110 via execution of one or more software modules such as, for example, the application(s) 120, the sensor detector module 122, the pressure analysis module 124, and/or other software/firmware components described herein. It should be understood that additional and/or alternative devices and/or network nodes can provide the functionality described herein via execution of one or more modules, applications, and/or other software. Thus, the illustrated embodiments are illustrative, and should not be viewed as being limiting in any way.

The method 200 will be described as being performed by the user device 110 with reference to FIGS. 1 and 2. The method 200 begins and proceeds to operation 202, where the user device 110 receives the pressure sensor output 108 from the pressure sensor 106. From operation 202, the method 200 proceeds to operation 204, where the user device 110 executes the pressure analysis module 124 to analyze the pressure sensor output 108 to determine a command to be executed by the user device 110. From operation 204, the method 200 proceeds to operation 206, where the user device 110 executes the command determined at operation 204. From operation 206, the method 200 proceeds to operation 208. The method 200 ends at operation 208.

The command can be executed by the user device 110 to control any operation of the user device 110. For example, the command can be executed by the user device 110 to power-off the user device 110, to enable a low-power or other power state of the user device 110, to enable an auto-brightness setting for a display of the user device 110, to adjust the brightness of the display of the user device 110, to launch one or more of the applications 120, to switch between two or more of the applications 120, to cause one or more of the applications 120 to perform an operation, to close one or more of the applications 120, to cause the operating system 118 to perform an operation, to enable or adjust one or more settings of the user device 110, to cause the operating system 118 and/or one or more of the applications 120 to cause a hardware component (e.g., a camera) to perform an operation, and/or to perform like operations.

The command can be executed by the user device 110 to cause the user device 110 to control one or more operations of another device or system. For example, the command can be executed by the user device 110 to instruct one or more of the systems/devices 116 to perform one or more operations.

The pressure analysis module 124 can determine a command to be executed by the user device 110 by comparing the pressure sensor output 108 received from the pressure sensor 106 to one or more pressure profiles mapped to one or more commands that are available for execution in response to pressure input. As used herein, a "pressure profile" refers to single or multiple tap movements, contact time, frequency, pattern, and/or sequence exhibited by a particular pressure sensor output. A pressure profile can be mapped to one or more commands such that when the pressure analysis module 124 determines, through an analysis of the pressure sensor output 108, that the pressure sensor output 108 matches a particular pressure profile, the pressure analysis module 124 instructs the user device 110 to execute a command or multiple commands associated with that pressure profile.

In some embodiments, the user device 110 is configured to execute one or more commands in response to the pressure sensor output 108 being indicative of a pre-defined pressure profile. Pre-defined pressure profiles may be pre-defined by a developer of one or more of the application(s) 120, a developer of the operating system 118, a manufacturer of the user device 110, a service provider that provides, for example, a mobile telephony service that allows the user device 110 to connect to the network 114, and/or one or more other entities. A pre-defined pressure profile may be assigned to a default command or may be assigned to a custom command. Moreover, pre-defined pressure profiles may be mapped and remapped to execute different commands based upon the needs of the user 102.

In some embodiments, the user device 110 is configured to execute one or more commands in response to the pressure sensor output 108 being indicative of a custom pressure profile. Custom pressure profiles may be defined by the user 102. In this manner, the user 102 may control the user device 110 via pressure input that is custom designed by the user 102 so as to prevent unauthorized use of the user device 110. A custom pressure profile may be created using a custom pressure profile creation procedure, an example of which is described herein below with reference to FIG. 5.

Figure 3:
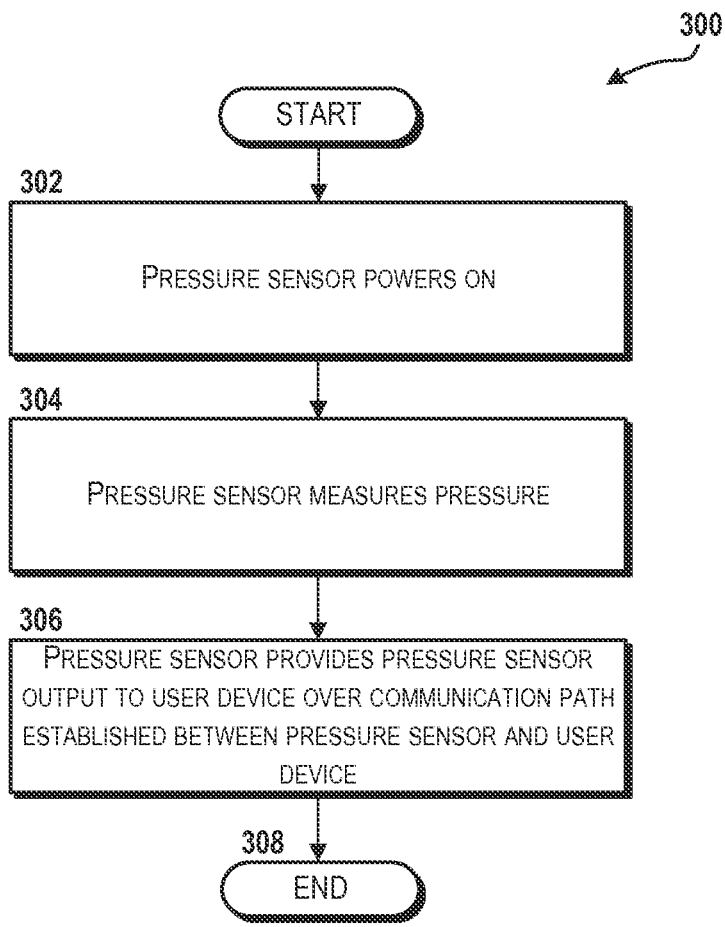
FIG. 3 is a flow diagram illustrating aspects of a method for measuring pressure, according to an illustrative embodiment.

Turning now to FIG. 3, a method 300 for measuring pressure will be described, according to an illustrative embodiment. The method 300 will be described with reference to FIGS. 1 and 3. The method 300 begins and proceeds to operation 302, where the pressure sensor 106 powers on. In some embodiments, the pressure sensor 106 operates in a low power state and "wakes up" upon detection of a pressure. In some other embodiments, the pressure sensor 106 operates in an "on" state and does not utilize a "wake-on" function.

From operation 302, the method 300 proceeds to operation 304, where the pressure sensor 106 measures pressure exerted by the user 102 on the surface 104. In the example, shown in FIG. 1, the pressure sensor 106 can measure pressure exerted by an index finger of the user 102 on the surface 104. From operation 304, the method 300 proceeds to operation 306, where the pressure sensor 106 provides the pressure sensor output 108 to the user device 110 via the communications path 112. From operation 306, the method 300 proceeds to operation 308. The method 300 ends at operation 308.

Figure 4:
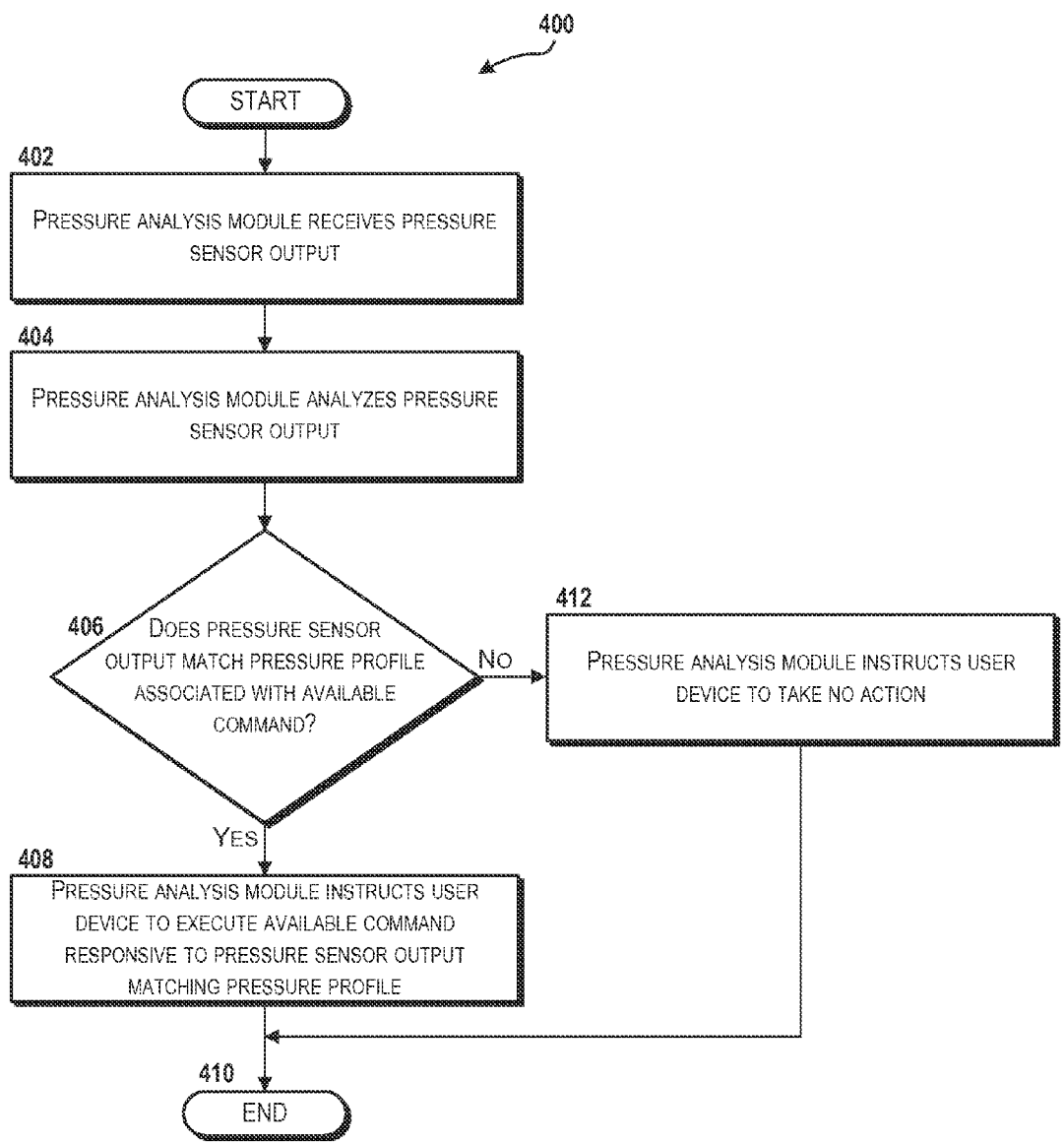
FIG. 4 is a flow diagram illustrating aspects of a method for analyzing pressure sensor output, according to an illustrative embodiment.

Turning now to FIG. 4, a method 400 for analyzing pressure sensor output will be described, according to an illustrative embodiment. The method 400 will be described with reference to FIGS. 1 and 4. The method 400 begins at operation 402, where the pressure analysis module 124 receives the pressure sensor output 108. From operation 402, the method 400 proceeds to operation 404, where the pressure analysis module 124 analyzes the pressure sensor output 108.

The pressure sensor output 108 contains pressure data that is indicative of pressure exerted by the user 102 on the surface 104. The pressure analysis module 124 analyzes the pressure data to determine how many discrete pressure points are included in the pressure sensor output 108. Each discrete pressure point can be indicative of a tap movement performed by the user 102 on the surface 104. Each discrete pressure point can have a pressure value that identifies the amount of pressure exerted by the user 102 on the surface 104. In addition, at operation 404, the pressure analysis module 124 can analyze the pressure data to determine the contact time for each of the pressure points, to determine the frequency of the pressure points, to determine the pattern, if any, of the pressure points, and to determine the sequence (for multi-sensor outputs) of the pressure points. The number of discrete pressure points, contact time, frequency, pattern, and/or sequence determined by the pressure analysis module 124 can then be compared to one or more pressure profiles that are associated with an available command. The available commands, in this context, include commands that can be executed in response to pressure input and therefore are associated with a particular pressure profile. Accordingly, from operation 404, the method 400 proceeds to operation 406, where the pressure analysis module 124 determines whether the pressure sensor output 108 matches a pressure profile associated with an available command.

If, at operation 406, the pressure analysis module 124 determines that the pressure sensor output 108 matches a pressure profile associated with an available command, the method 400 proceeds to operation 408. At operation 408, the pressure analysis module 124 instructs the user device 110 to execute the available command responsive to the pressure sensor output 108 matching a pressure profile associated with the available command. From operation 408, the method 400 proceeds to operation 410. The method 400 ends at operation 410.

If, at operation 406, the pressure analysis module 124 determines that the pressure sensor output 108 does not match a pressure profile associated with an available command, the method 400 proceeds to operation 412. At operation 412, the pressure analysis module 124 instructs the user device 110 to take no action in response to the pressure sensor output 108. From operation 412, the method 400 proceeds to operation 410. The method 400 ends at operation 410.

Figure 5:
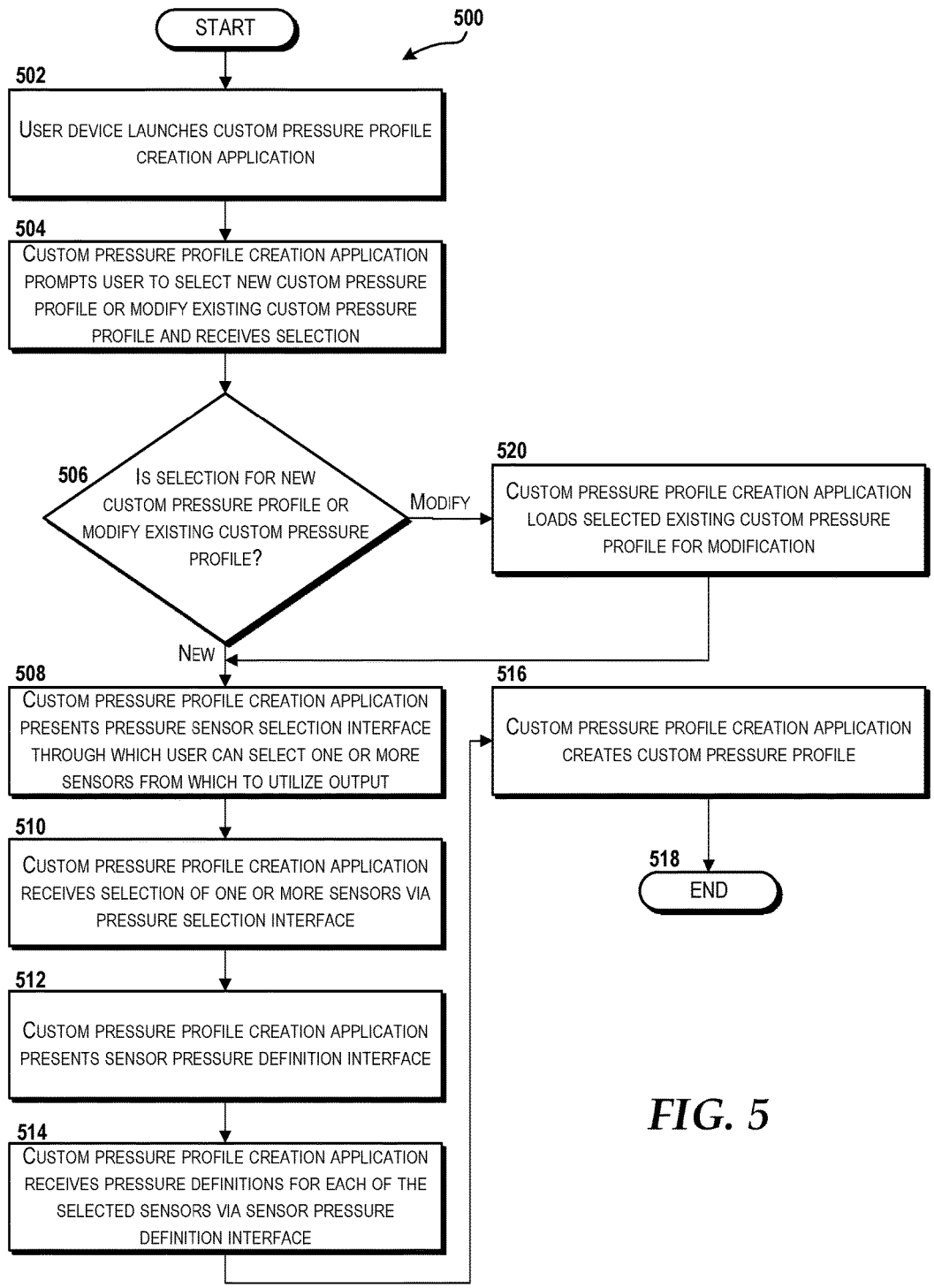
FIG. 5 is a flow diagram illustrating aspects of a method for creating a custom pressure profile, according to an illustrative embodiment.

Turning now to FIG. 5, a method 500 for creating a custom pressure profile will be described, according to an illustrative embodiment. The method 500 will be described with reference to FIGS. 1 and 5. The method 500 begins and proceeds to operation 502, where the user device 110 launches a custom pressure profile creation application. The custom pressure profile creation application, in some embodiments, is one of the application(s) 120. The custom pressure profile creation application, in some other embodiments, is provided as part of the operating system 118.

From operation 502, the method 500 proceeds to operation 504, where the custom pressure profile creation application prompts the user 102 to select an option to create a new custom pressure profile or an option to modify an existing custom pressure profile. From operation 504, the method 500 proceeds to operation 506, where the custom pressure profile creation application determines whether the user 102 selects the option to create a new custom pressure profile or the option to modify an existing custom pressure profile.

If, at operation 506, the custom pressure profile creation application determines that the user 102 selected a new custom pressure profile, the method 500 proceeds to operation 508, where the custom pressure profile creation application presents a pressure sensor selection interface. The pressure sensor selection interface provides a way for the user 102 to select from which sensor(s) pressure output(s) should be considered. In some embodiments, the custom pressure profile creation application communicates with the sensor detector module 122 to determine the pressure sensor(s) 106 available and presents the available pressure sensor(s) for selection by the user 102. From operation 508, the method 500 proceeds to operation 510, where the custom pressure profile creation application receives a selection of one or more sensors from the pressure sensor selection interface.

From operation 510, the method 500 proceeds to operation 512, where the custom pressure profile creation application presents a sensor pressure definition interface. The sensor pressure definition interface provides a way for the user 102 to define a pressure value for each of the sensors selected at operation 510. The pressure value can include a minimum pressure that, when reached, satisfies the profile requirements for the associated sensor. The pressure value can additionally or alternatively include a maximum pressure. The pressure value can include a pressure range so that as long as the pressure exerted by the user 102 is within the pressure range, the profile requirements for the associated sensor are satisfied. In addition to the pressure value, the sensor pressure definition interface provides a way for the user 102 to define contact time, frequency, pattern, and/or sequence parameters for the selected sensors. From operation 512, the method 500 proceeds to operation 514, where the custom pressure profile creation application receives pressure definitions for each of the selected sensors.

From operation 514, the method 500 proceeds to operation 516, where the custom pressure profile creation application creates a new custom pressure profile based upon the input received at operations 510 and 514. From operation 516, the method 500 proceeds to operation 518. The method 500 ends at operation 518.

If, at operation 506, the custom pressure profile creation application determines that the user 102 selected to modify an existing custom pressure profile, the method 500 proceeds to operation 520, where the custom pressure profile creation application loads the selected existing custom pressure profile for modification. From operation 520, the method 500 proceeds to operation 508, where the custom pressure profile creation application presents the pressure sensor selection interface. Since an existing custom pressure profile has been loaded at operation 520, the pressure sensor selection interface can allow the user 102 to deselect one or more sensors utilized in the existing custom pressure profile and/or select new sensors at operation 510.

From operation 510, the method 500 proceeds to operation 512, where the custom pressure profile creation application presents the sensor pressure definition interface. Since an existing custom pressure profile has been loaded at operation 520, the sensor pressure definition interface can allow the user 102 to add additional pressure parameters, modify existing pressure parameters, and/or delete pressure parameters for the selected sensors. From operation 512, the method 500 proceeds to operation 514, where the custom pressure profile creation application receives additional pressure parameters, modifications to existing pressure parameters, and/or deletions of pressure parameters for the selected sensors.

From operation 514, the method 500 proceeds to operation 516, where the custom pressure profile creation application creates a new custom pressure profile based upon the input received at operations 510 and 514. From operation 516, the method 500 proceeds to operation 518. The method 500 ends at operation 518.

Figure 6:
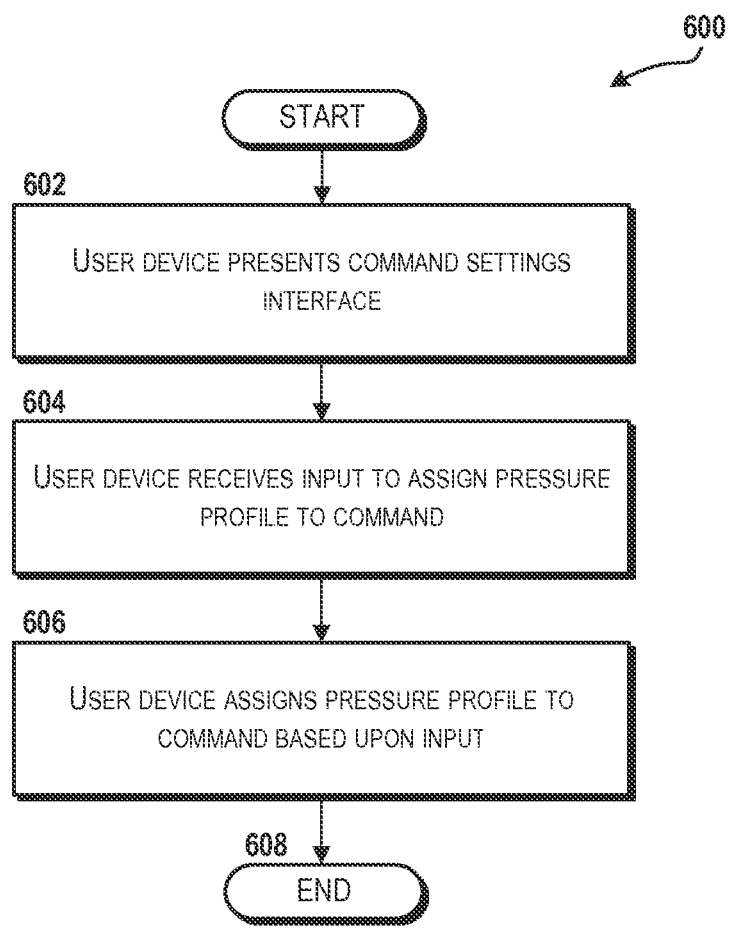
FIG. 6 is a flow diagram illustrating aspects of a method for associating a pressure profile with a command to be executed by the user device.

Turning now to FIG. 6, a method for associating a pressure profile with a command to be executed by the user device 110 will be described, according to an illustrative embodiment. The method 600 will be described with reference to FIGS. 1 and 6. The method 600 begins and proceeds to operation 602, where the user device 110 presents a command settings interface. The command settings interface provides a way for the user 102 to assign pressure profiles to commands. The command settings interface can include pre-defined pressure profiles and/or custom pressure profiles. In some embodiments, the command settings interface can provide access to the custom pressure profile creation application described in FIG. 5 so that the user 102 can create a new custom pressure profile or modify an existing custom pressure profile for assignment to one or more commands via the command settings interface.

In some embodiments, the command settings interface is provided as part of the operating system 118. In these embodiments, the user 102 can assign pressure profiles to device commands that are controlled by the operating system 118. For example, the user 102 can assign a pressure profile to power-off the user device 110, change the volume of the user device 110, toggle vibration settings, enable/disable WI-FI and cellular radios, and other commands associated with the operation of the user device 110.

In some other embodiments, the command settings interface is provided as part of one or more of the applications 120. In these embodiments, the user 102 can assign pressure profiles to application-specific commands. For example, the user 102 can assign a pressure profile to use for controlling a character in a gaming application.

From operation 602, the method 600 proceeds to operation 604, where the user device 110 receives an input to assign a pressure profile to a command. In some embodiments, the command settings interface presents a plurality of commands and one or more profiles that may be assigned to each of the plurality of commands. These embodiments may be implemented using drop-down menus or any other suitable graphical user interface ("GUI") design. A command may alternatively be assigned to a pressure profile.

From operation 604, the method 600 proceeds to operation 606, where the user device 110 assigns the pressure profile to the command in accordance with the input received at operation 604. After a pressure profile is assigned to a command and when the user device 110 receives the pressure sensor output 108 that is indicative of the pressure profile, the user device executes the assigned command.

From operation 606, the method 600 proceeds to operation 608. The method 600 ends at operation 608.

Figure 7:
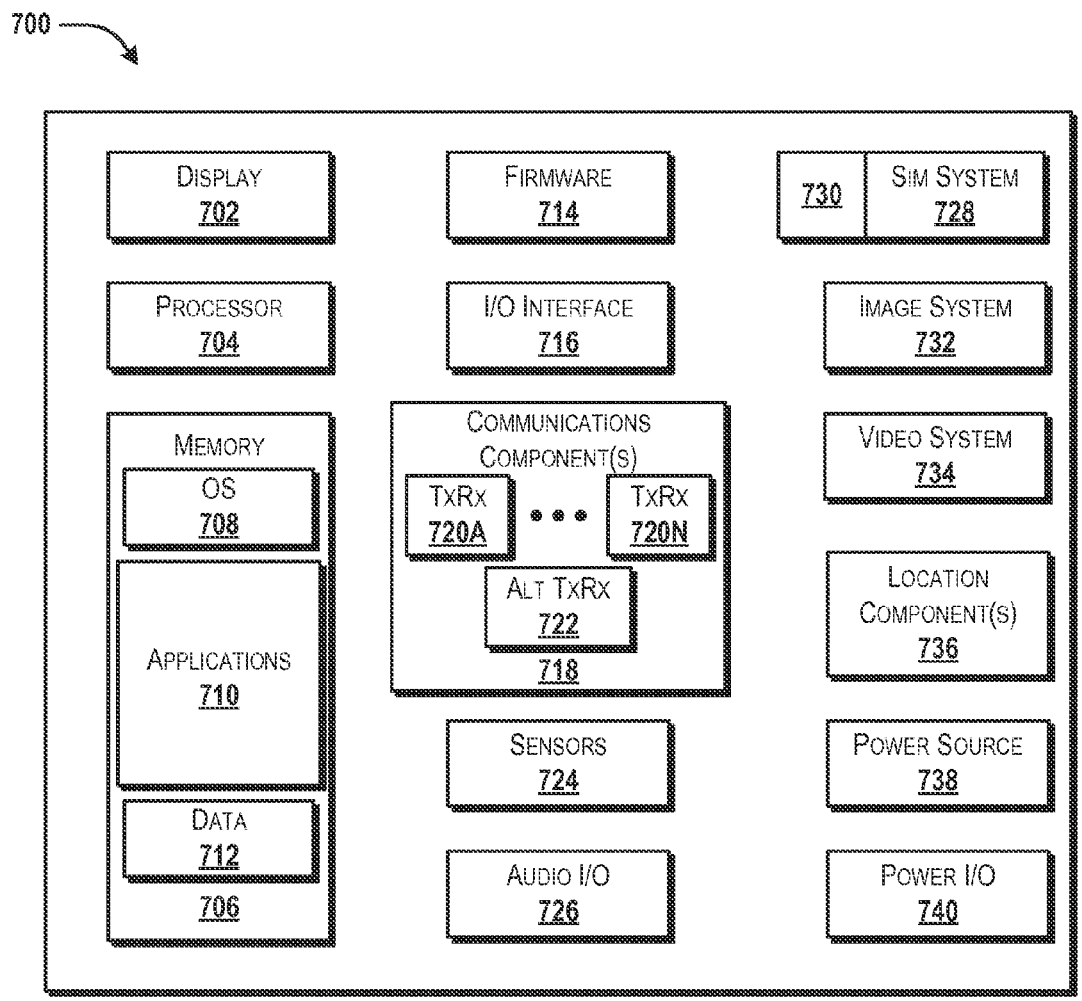
FIG. 7 schematically illustrates a network, according to an illustrative embodiment.

Turning now to FIG. 7, an illustrative mobile device 700 and components thereof will be described. In some embodiments, the user device 110 described above, in part, with reference to FIG. 1 can be configured as and/or can have an architecture similar or identical to the mobile device 700 described herein with respect to FIG. 7. It should be understood, however, that the user device 110 may or may not include the functionality described herein with reference to FIG. 7. While connections are not shown between the various components illustrated in FIG. 7, it should be understood that some, none, or all of the components illustrated in FIG. 7 can be configured to interact with one other to carry out various device functions. In some embodiments, the components are arranged so as to communicate via one or more busses (not shown). Thus, it should be understood that FIG. 7 and the following description are intended to provide a general understanding of a suitable environment in which various aspects of embodiments can be implemented, and should not be construed as being limiting in any way.

As illustrated in FIG. 7, the mobile device 700 can include a display 702 for displaying data. According to various embodiments, the display 702 can be configured to display various graphical user interface ("GUI") elements, text, images, video, virtual keypads and/or keyboards, messaging data, notification messages, metadata, internet content, device status, time, date, calendar data, device preferences, map and location data, customer service interactions, combinations thereof, and the like. The mobile device 700 also can include a processor 704 and a memory or other data storage device ("memory") 706. The processor 704 can be configured to process data and/or can execute computer-executable instructions stored in the memory 706. The computer-executable instructions executed by the processor 704 can include, for example, an operating system 708 such as the operating system 118, one or more applications 710 such as the application(s) 120, other computer-executable instructions stored in a memory 706, or the like. In some embodiments, the applications 710 also can include a UI application (not illustrated in FIG. 7).

The UI application can interface with the operating system 708 to facilitate user interaction with functionality and/or data stored at the mobile device 700 and/or stored elsewhere, such as in one or more of the systems/devices 116. In some embodiments, the operating system 708 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 704 to aid the user 102 in interacting with the pressure sensor 106, the user device 110, the network 114, the systems/devices 116, and/or the other devices and/or systems not specifically described herein. The UI application can be executed by the processor 704 to aid a user in answering/initiating calls, entering/deleting other data, entering and setting user IDs and passwords for device access, configuring settings, manipulating address book content and/or settings, multimode interaction, interacting with other applications 710, and otherwise facilitating user interaction with the operating system 708, the applications 710, and/or other types or instances of data 712 that can be stored at the mobile device 700.

According to various embodiments, the applications 710 can include, for example, the application(s) 120, a visual field test application, a web browser application, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 710, the data 712, and/or portions thereof can be stored in the memory 706 and/or in a firmware 714, and can be executed by the processor 704. The firmware 714 also can store code for execution during device power up and power down operations. It should be appreciated that the firmware 714 can be stored in a volatile or non-volatile data storage device including, but not limited to, the memory 706 and/or a portion thereof.

The mobile device 700 also can include an input/output ("I/O") interface 716. The I/O interface 716 can be configured to support the input/output of data. In some embodiments, the I/O interface 716 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ411) port, an RJ11 port, a proprietary port, combinations thereof, or the like. In some embodiments, the mobile device 700 can be configured to synchronize with another device to transfer content to and/or from the mobile device 700. In some embodiments, the mobile device 700 can be configured to receive updates to one or more of the applications 710 via the I/O interface 716, though this is not necessarily the case. In some embodiments, the I/O interface 716 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 716 may be used for communications between the mobile device 700 and a network device or local device.

The mobile device 700 also can include a communications component 718. The communications component 718 can be configured to interface with the processor 704 to facilitate wired and/or wireless communications with one or more networks, such as the network 114. In some embodiments, the communications component 718 includes a multimode communications subsystem for facilitating communications via the cellular network and one or more other networks.

The communications component 718, in some embodiments, includes one or more transceivers. The one or more transceivers, if included, can be configured to communicate over the same and/or different wireless technology standards with respect to one another. For example, in some embodiments one or more of the transceivers of the communications component 718 may be configured to communicate using GSM, CDMAONE, CDMA2000, LTE, and various other 2G, 2.5G, 3G, 4G, and greater generation technology standards. Moreover, the communications component 718 may facilitate communications over various channel access methods (which may or may not be used by the aforementioned standards) including, but not limited to, TDMA, FDMA, W-CDMA, OFDM, SDMA, and the like.

In addition, the communications component 718 may facilitate data communications using GPRS, EDGE, the HSPA protocol family including HSDPA, EUL or otherwise termed HSUPA, HSPA+, and various other current and future wireless data access standards. In the illustrated embodiment, the communications component 718 can include a first transceiver ("TxRx") 720A that can operate in a first communications mode (e.g., GSM). The communications component 718 also can include an $N^{th}$ transceiver ("TxRx") 720N that can operate in a second communications mode relative to the first transceiver 720A (e.g., UMTS). While two transceivers 720A-N (hereinafter collectively and/or generically referred to as "transceivers 720") are shown in FIG. 7, it should be appreciated that less than two, two, or more than two transceivers 720 can be included in the communications component 718.

The communications component 718 also can include an alternative transceiver ("Alt TxRx") 722 for supporting other types and/or standards of communications. According to various contemplated embodiments, the alternative transceiver 722 can communicate using various communications technologies such as, for example, WI-FI, WIMAX, BLUETOOTH, BLE, infrared, infrared data association ("IRDA"), NFC, other RF technologies, combinations thereof, and the like.

In some embodiments, the communications component 718 also can facilitate reception from terrestrial radio networks, digital satellite radio networks, internet-based radio service networks, combinations thereof, and the like. The communications component 718 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 700 also can include one or more sensors 724. The sensors 724 can include temperature sensors, light sensors, air quality sensors, movement sensors, orientation sensors, noise sensors, proximity sensors, or the like. As such, it should be understood that the sensors 724 can include, but are not limited to, accelerometers, magnetometers, gyroscopes, infrared sensors, noise sensors, microphones, combinations thereof, or the like. One or more of the sensors 724 can be used to detect movement of the mobile device 700. Additionally, audio capabilities for the mobile device 700 may be provided by an audio I/O component 726. The audio I/O component 726 of the mobile device 700 can include one or more speakers for the output of audio signals, one or more microphones for the collection and/or input of audio signals, and/or other audio input and/or output devices.

The illustrated mobile device 700 also can include a subscriber identity module ("SIM") system 728. The SIM system 728 can include a universal SIM ("USIM"), a universal integrated circuit card ("UICC") and/or other identity devices. The SIM system 728 can include and/or can be connected to or inserted into an interface such as a slot interface 730. In some embodiments, the slot interface 730 can be configured to accept insertion of other identity cards or modules for accessing various types of networks. Additionally, or alternatively, the slot interface 730 can be configured to accept multiple subscriber identity cards. Because other devices and/or modules for identifying users and/or the mobile device 700 are contemplated, it should be understood that these embodiments are illustrative, and should not be construed as being limiting in any way.

The mobile device 700 also can include an image capture and processing system 732 ("image system"). The image system 732 can be configured to capture or otherwise obtain photos, videos, and/or other visual information. As such, the image system 732 can include cameras, lenses, charge-coupled devices ("CCDs"), combinations thereof, or the like. The mobile device 700 may also include a video system 734. The video system 734 can be configured to capture, process, record, modify, and/or store video content. Photos and videos obtained using the image system 732 and the video system 734, respectively, may be added as message content to an MMS message, email message, and sent to another mobile device. The video and/or photo content also can be shared with other devices via various types of data transfers via wired and/or wireless communication devices as described herein.

The mobile device 700 also can include one or more location components 736. The location components 737 can be configured to send and/or receive signals to determine a location of the mobile device 700. According to various embodiments, the location components 736 can send and/or receive signals from GPS devices, assisted-GPS ("A-GPS") devices, WI-FI/WIMAX and/or cellular network triangulation data, combinations thereof, and the like. The location component 736 also can be configured to communicate with the communications component 718 to retrieve triangulation data for determining a location of the mobile device 700. In some embodiments, the location component 736 can interface with cellular network nodes, telephone lines, satellites, location transmitters and/or beacons, wireless network transmitters and receivers, combinations thereof, and the like. In some embodiments, the location component 736 can include and/or can communicate with one or more of the sensors 724 such as a compass, an accelerometer, and/or a gyroscope to determine the orientation of the mobile device 700. Using the location component 736, the mobile device 700 can generate and/or receive data to identify its geographic location, or to transmit data used by other devices to determine the location of the mobile device 700. The location component 736 may include multiple components for determining the location and/or orientation of the mobile device 700.

The illustrated mobile device 700 also can include a power source 736. The power source 736 can include one or more batteries, power supplies, power cells, and/or other power subsystems including alternating current ("AC") and/or direct current ("DC") power devices. The power source 736 also can interface with an external power system or charging equipment via a power I/O component 740. Because the mobile device 700 can include additional and/or alternative components, the above embodiment should be understood as being illustrative of one possible operating environment for various embodiments of the concepts and technologies described herein. The described embodiment of the mobile device 700 is illustrative, and should not be construed as being limiting in any way.

Figure 8:
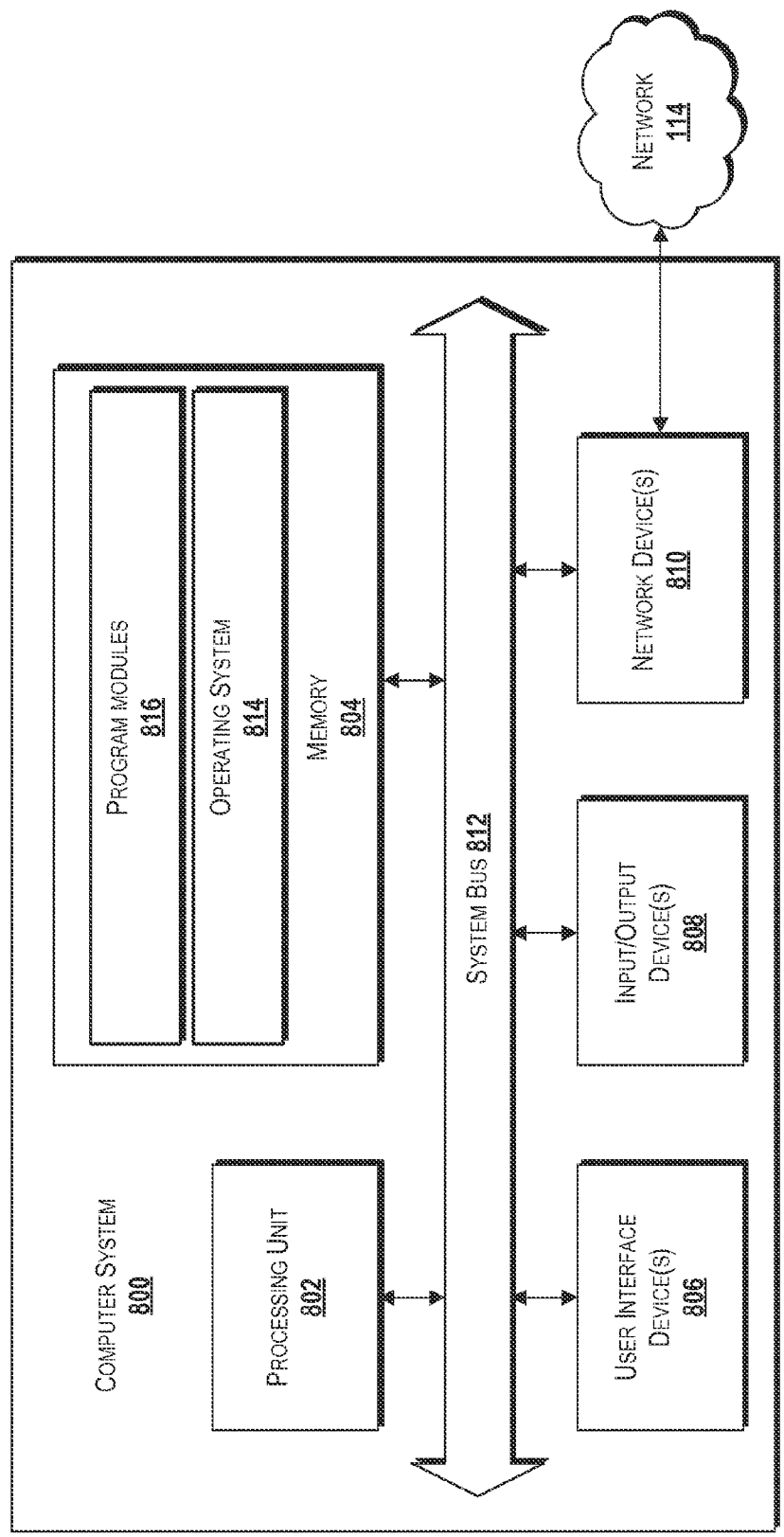
FIG. 8 is a block diagram illustrating an example computer system, according to some illustrative embodiments.

FIG. 8 is a block diagram illustrating a computer system 800 configured to provide the functionality described herein in accordance with various embodiments of the concepts and technologies disclosed herein. In some embodiments, the user device 110 and/or one or more of the systems/devices 116 can be configured as and/or can have an architecture similar or identical to the computer system 800 described herein with respect to FIG. 8. It should be understood, however, that the user device 110 and/or one or more of the systems/devices 116 may or may not include the functionality described herein with reference to FIG. 8.

The computer system 800 includes a processing unit 802, a memory 804, one or more user interface devices 806, one or more input/output ("I/O") devices 808, and one or more network devices 810, each of which is operatively connected to a system bus 812. The bus 812 enables bi-directional communication between the processing unit 802, the memory 804, the user interface devices 806, the I/O devices 808, and the network devices 810.

The processing unit 802 may be a standard central processor that performs arithmetic and logical operations, a more specific purpose programmable logic controller ("PLC"), a programmable gate array, or other type of processor known to those skilled in the art and suitable for controlling the operation of the computer system 800. Processing units are generally known, and therefore are not described in further detail herein.

The memory 804 communicates with the processing unit 802 via the system bus 812. In some embodiments, the memory 804 is operatively connected to a memory controller (not shown) that enables communication with the processing unit 802 via the system bus 812. The memory 804 includes an operating system 814 such as the operating system 118, and one or more program modules 816 such as one or more of the applications 120. The operating system 814 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, and/or iOS families of operating systems from APPLE CORPORATION, the FREEBSD family of operating systems, the SOLARIS family of operating systems from ORACLE CORPORATION, other operating systems, and the like.

The program modules 816 may include various software and/or program modules described herein. In some embodiments, for example, the program modules 816 include the application(s) 120. The program modules 8166 can be embodied in computer-readable media containing instructions that, when executed by the processing unit 802, perform at least a portion of one or more of the methods described above. According to embodiments, the program modules 816 may be embodied in hardware, software, firmware, or any combination thereof.

By way of example, and not limitation, computer-readable media may include any available computer storage media or communication media that can be accessed by the computer system 800. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 800. In the claims, the phrase "computer storage medium" and variations thereof does not include waves or signals per se and/or communication media.

The user interface devices 806 may include one or more devices with which a user accesses the computer system 800. The user interface devices 806 may include, but are not limited to, computers, servers, personal digital assistants, cellular phones, or any suitable computing devices. The I/O devices 808 enable a user to interface with the program modules 816. In one embodiment, the I/O devices 808 are operatively connected to an I/O controller (not shown) that enables communication with the processing unit 802 via the system bus 812. The I/O devices 808 may include one or more input devices, such as, but not limited to, a keyboard, a mouse, or an electronic stylus. Further, the I/O devices 808 may include one or more output devices, such as, but not limited to, a display screen or a printer to output data in the form of text, numbers, characters, maps, other visualizations, and the like.

The network devices 810 enable the computer system 800 to communicate with other networks or remote systems via one or more networks such as the network 114. Examples of the network devices 810 include, but are not limited to, a modem, a radio frequency ("RF") or infrared ("IR") transceiver, a telephonic interface, a bridge, a router, or a network card. The network 114 may include a wireless network such as, but not limited to, a WLAN such as a WI-FI network, a WWAN, a Wireless Personal Area Network ("WPAN") such as BLUETOOTH, a WMAN such a WiMAX network, or a cellular network. Alternatively, the network 114 may be a wired network such as, but not limited to, a WAN such as the Internet, a LAN, a wired PAN, or a wired MAN.

Figure 9:
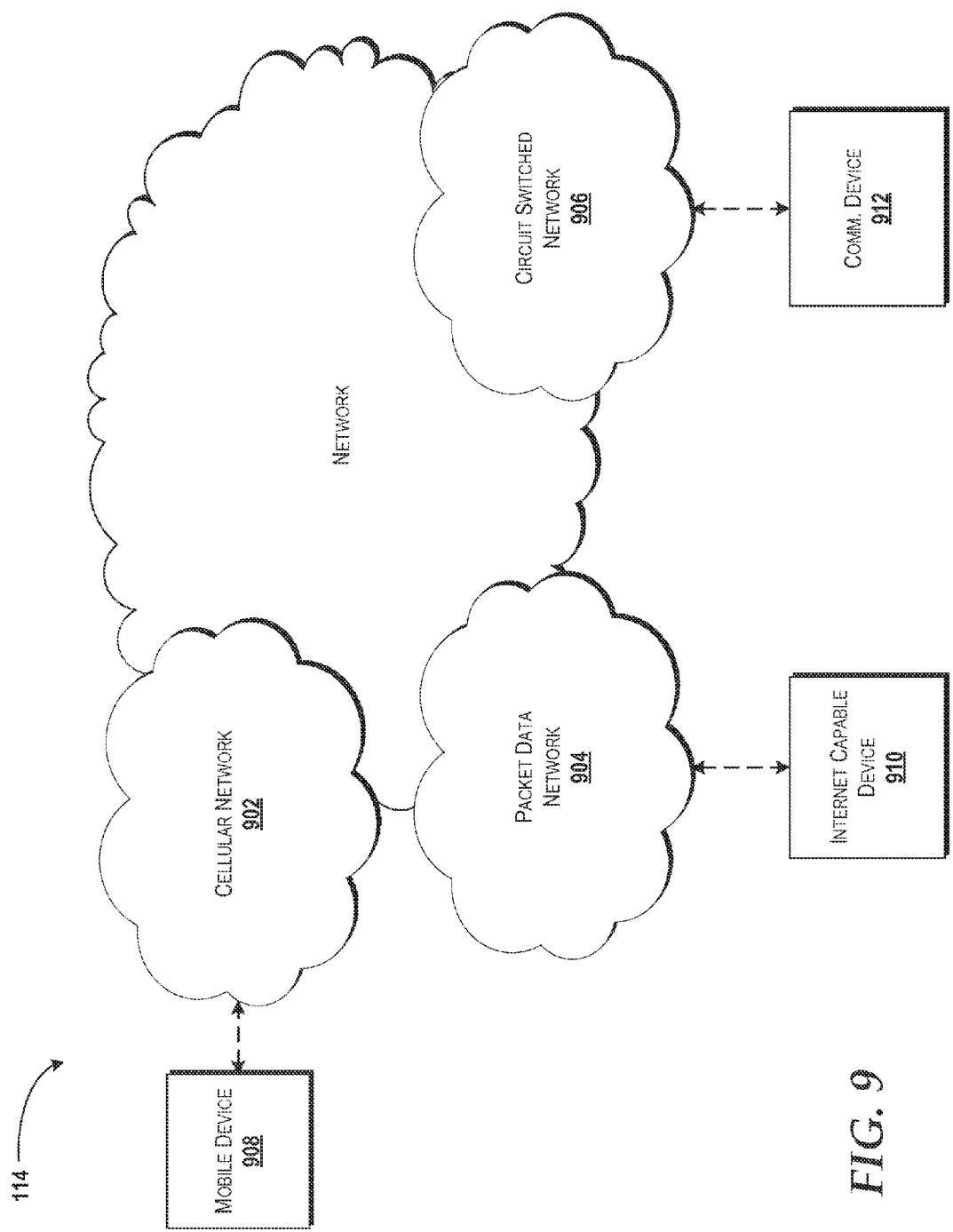
FIG. 9 is a block diagram illustrating an example mobile device, according to some illustrative embodiments.

Turning now to FIG. 9, additional details of an embodiment of the network 114 are illustrated, according to an illustrative embodiment. The network 114 includes a cellular network 902, a packet data network 904, for example, the Internet, and a circuit switched network 906, for example, a publicly switched telephone network ("PSTN"). The cellular network 902 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 902 also includes radios and nodes for receiving and transmitting voice, data, and combinations thereof to and from radio transceivers, networks, the packet data network 904, and the circuit switched network 906.

A mobile communications device 909, such as, for example, the user device 110, a cellular telephone, a user equipment, a mobile terminal, a PDA, a laptop computer, a handheld computer, and combinations thereof, can be operatively connected to the cellular network 902. The cellular network 902 can be configured as a 2G GSM network and can provide data communications via GPRS and/or EDGE. Additionally, or alternatively, the cellular network 902 can be configured as a 3G UMTS network and can provide data communications via the HSPA protocol family, for example, HSDPA, EUL (also referred to as HSUPA), and HSPA+. The cellular network 902 also is compatible with 4G mobile communications standards as well as evolved and future mobile standards.

The packet data network 904 includes various devices, for example, servers, computers, databases, and other devices in communication with another, as is generally known. The packet data network 904 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 904 includes or is in communication with the Internet. The circuit switched network 906 includes various hardware and software for providing circuit switched communications. The circuit switched network 906 may include, or may be, what is often referred to as a plain old telephone system ("POTS"). The functionality of a circuit switched network 906 or other circuit-switched network are generally known and will not be described herein in detail.

The illustrated cellular network 902 is shown in communication with the packet data network 904 and a circuit switched network 906, though it should be appreciated that this is not necessarily the case. One or more Internet-capable devices 910, for example, the user device 110, a personal computer ("PC"), a laptop, a portable device, or another suitable device, can communicate with one or more cellular networks 902, and devices connected thereto, through the packet data network 904. It also should be appreciated that the Internet-capable device 910 can communicate with the packet data network 904 through the circuit switched network 906, the cellular network 902, and/or via other networks (not illustrated).

As illustrated, a communications device 912, for example, the user device 110, a telephone, facsimile machine, modem, computer, or the like, can be in communication with the circuit switched network 906, and therethrough to the packet data network 904 and/or the cellular network 902. It should be appreciated that the communications device 912 can be an Internet-capable device, and can be substantially similar to the Internet-capable device 910. In the specification, the network 114 may be used to refer broadly to any combination of the networks 902, 904, 906. It should be appreciated that substantially all of the functionality described with reference to the network 114 can be performed by the cellular network 902, the packet data network 904, and/or the circuit switched network 906, alone or in combination with other networks, network elements, and the like.

Based on the foregoing, it should be appreciated that aspects of a pressure-based input method for user devices have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

What is claimed is:

1. A method comprising:
   launching, by a user device comprising a processor, a custom pressure profile creation application;
   prompting, by the processor executing the custom pressure profile creation application, a user to select a first option to create a new custom pressure profile or a second option to modify an existing custom pressure profile;
   receiving, by the custom pressure profile creation application, a selection of the first option or the second option;
   when the selection of the first option or the second option is for the first option,
      presenting, by the custom pressure profile creation application, a pressure sensor selection interface through which the user can select at least one sensor from a plurality of available sensors from which to utilize pressure output,
      receiving, by the custom pressure profile creation application, a selection of the at least one sensor from the plurality of available sensors,
      presenting, by the custom pressure profile creation application, a pressure sensor definition interface through which the user can provide a pressure definition for each sensor in the selection of the at least one sensor from the plurality of available sensors,
      receiving, by the custom pressure profile creation application, the pressure definition for each sensor in the selection of the at least one sensor from the plurality of available sensors,
      creating, by the custom pressure profile creation application, the new custom pressure profile comprising the pressure definition for each sensor in the selection of the at least one sensor from the plurality of available sensors;
   when the selection is for the second option,
      loading, by the custom pressure profile creation application, the existing custom pressure profile, and
      receiving, by the custom pressure profile creation application, a modification to the existing custom pressure profile;
   receiving, by the user device, an output from a pressure sensor of the plurality of available sensors, the output comprising parameters associated with a pressure applied to the pressure sensor by the user, wherein the pressure sensor is associated with a pressure profile, and wherein the pressure profile comprises either the custom pressure profile or the existing custom pressure profile;
   analyzing, by a pressure analysis module executed by the processor of the user device, the output to determine a command to be executed by the user device by determining whether the parameters associated with the pressure applied to the pressure sensor by the user matches a pressure profile associated with the command;

when the pressure applied to the pressure sensor by the user matches the pressure profile associated with the command, instructing, by the pressure analysis module, the user device to execute the command; and when the pressure applied to the pressure sensor by the user does not match the pressure profile associated with the command, instructing, by the pressure analysis module, the user device to take no action.

2. The method of claim 1 wherein the pressure profile alternatively comprises a default pressure profile, the default pressure profile provided by an operating system of the user device.

3. The method of claim 1, further comprising:

presenting, by the user device, a command settings interface;

receiving, via the command settings interface, an input to assign the pressure profile to the command; and assigning, by the user device, the pressure profile to the command.

4. The method of claim 3, wherein the command settings interface is part of an operating system executing on the user device, and wherein the command is associated with an operation of the operating system.

5. The method of claim 3, wherein the command settings interface is part of an application executing on the user device, and wherein the command is associated with an operation of the application.

6. The method of claim 1, further comprising:

receiving, by the user device a further output from a further pressure sensor, the further output comprising further parameters associated with a further pressure applied by the further pressure sensor by the user; and analyzing, by the user device, the further output to determine the command to be executed by the user device;

wherein analyzing, by the user device, the output and the further output to determine the command to be executed by the user device comprises analyzing, by the pressure analysis module executed by the processor of the user device, the output and the further output to determine the command to be executed by the user device by determining whether the parameters and the further parameters associated with the pressure and the further pressure, respectively, applied to the pressure sensor by the user matches the pressure profile associated with the command, and if so, instructing, by the pressure analysis module, the user device to execute the command, and if not, instructing the user device to take no action.

7. The method of claim 6, wherein the parameters and the further parameters represent, at least in part, a sequence of application of the pressure and the further pressure.

8. The method of claim 6, wherein the parameters and the further parameters represent, at least in part, a pattern of application of the pressure and the further pressure.

9. A user device comprising:

a processor; and memory storing computer-executable instructions comprising a custom pressure profile application that, when executed by the processor, cause the processor to perform operations comprising launching the custom pressure profile creation application, prompting a user to select a first option to create a new custom pressure profile or a second option to modify an existing custom pressure profile, receiving a selection of the first option or the second option, when the selection of the first operation or the second option is for the first option, presenting a pressure sensor selection interface through which the user can select at least one sensor from a plurality of available sensors from which to utilize pressure output, receiving a selection of the at least one sensor from the plurality of available sensors, presenting a pressure sensor definition interface through which the user can provide a pressure definition for each sensor in the selection of the at least one sensor from the plurality of available sensors, receiving the pressure definition for each sensor in the selection of the at least one sensor from the plurality of available sensors, creating the new custom pressure profile comprising the pressure definition for each sensor in the selection of the at least one sensor from the plurality of available sensors;

when the selection is for the second option, loading, by the custom pressure profile creation application, the existing custom pressure profile, and receiving, by the custom pressure profile creation application, a modification to the existing custom pressure profile, receiving an output from a pressure sensor of the plurality of available sensors, the output comprising parameters associated with a pressure applied to the pressure sensor by the user, wherein the pressure sensor is associated with a pressure profile, and wherein the pressure profile comprises either the custom pressure profile or the existing custom pressure profile, analyzing the output to determine a command to be executed by the user device by determining whether the parameters associated with the pressure applied to the pressure sensor by the user matches a pressure profile associated with the command, when the pressure applied to the pressure sensor by the user matches the pressure profile associated with the command, instructing, by the pressure analysis module, the user device to execute the command; and when the pressure applied to the pressure sensor by the user does not match the pressure profile associated with the command, instructing, by the pressure analysis module, the user device to take no action.

10. The user device of claim 9, wherein the pressure profile alternatively comprises a default pressure profile, the default pressure profile provided by an operating system of the user device.

11. The user device of claim 9, wherein the operations further comprise:

receiving a further output from a further pressure sensor, the further output comprising further parameters associated with a further pressure applied by the further pressure sensor by the user; and analyzing the further output to determine the command to be executed;

wherein analyzing the output and the further output to determine the command to be executed comprises analyzing the output and the further output to determine the command to be executed by determining whether the parameters and the further parameters associated with the pressure and the further pressure, respectively, applied to the pressure sensor by the user matches the pressure profile associated with the command, and if so, executing the command, and if not, taking no action.

12. The user device of claim 11, wherein the parameters and the further parameters represent, at least in part, a sequence of application of the pressure and the further pressure.

13. The user device of claim 11, wherein the parameters and the further parameters represent, at least in part, a pattern of application of the pressure and the further pressure.

14. The user device of claim 9, wherein the operations further comprise:
  presenting a command settings interface;
  receiving an input to assign the pressure profile to the command; and
  assigning the pressure profile to the command.

15. The user device of claim 14, wherein the command settings interface is part of an operating system executing on the user device, and wherein the command is associated with an operation of the operating system.

16. The user device of claim 14, wherein the command settings interface is part of an application executing on the user device, and wherein the command is associated with an operation of the application.

17. A computer storage medium having computer-executable instructions comprising a custom pressure profile creation application stored thereon that, when executed by a processor of a user device, cause the user device to perform operations comprising:
  launching the custom pressure profile creation application;
  prompting a user to select a first option to create a new custom pressure profile or a second option to modify an existing custom pressure profile;
  receiving a selection of the first option or the second option;
  when the selection of the first operation or the second option is for the first option,
    presenting a pressure sensor selection interface through which the user can select at least one sensor from a plurality of available sensors from which to utilize pressure output,
    receiving a selection of the at least one sensor from the plurality of available sensors,
    presenting a pressure sensor definition interface through which the user can provide a pressure definition for each sensor in the selection of the at least one sensor from the plurality of available sensors,
    receiving the pressure definition for each sensor in the selection of the at least one sensor from the plurality of available sensors,
    creating the new custom pressure profile comprising the pressure definition for each sensor in the selection of the at least one sensor from the plurality of available sensors;
  when the selection is for the second option,
    loading the existing custom pressure profile, and
    receiving a modification to the existing custom pressure profile;
  receiving an output from a pressure sensor from the plurality of available sensors, the output comprising parameters associated with a pressure applied to the pressure sensor by the user, wherein the pressure sensor is associated with a pressure profile, and wherein the pressure profile comprises either the custom pressure profile or the existing custom pressure profile;
  analyzing the output to determine whether the parameters associated with the pressure applied to the pressure sensor by the user matches the pressure profile associated with a command to be executed by the user device;
  when the pressure applied to the pressure sensor by the user matches the pressure profile associated with the command, instructing the user device to execute the command; and
  when the pressure applied to the pressure sensor by the user does not match the pressure profile associated with the command, instructing the user device to take no action.

18. The computer storage medium of claim 17, wherein the operations further comprise:
  receiving a further output from a further pressure sensor, the further output comprising further parameters associated with a further pressure applied by the further pressure sensor by the user; and
  analyzing the further output to determine the command to be executed;
  wherein analyzing the output and the further output to determine the command to be executed comprises analyzing the output and the further output to determine the command to be executed by determining whether the parameters and the further parameters associated with the pressure and the further pressure, respectively, applied to the pressure sensor by the user matches the pressure profile associated with the command, and if so, executing the command, and if not, taking no action; and
  wherein the parameters and the further parameters represent, at least in part, a sequence of application of the pressure and the further pressure or a pattern of application of the pressure and the further pressure.

19. The computer storage medium of claim 17, wherein the operations further comprise:
  presenting a command settings interface;
  receiving an input to assign the pressure profile to the command; and
  assigning the pressure profile to the command.

20. The computer storage medium of claim 19, wherein the command settings interface is part of an operating system, and the command is associated with an operation of the operating system; or wherein the command settings interface is part of an application, and the command is associated with an operation of the application.

* * * * *